(12) United States Patent  
Gao et al.

(10) Patent No.: US 9,106,819 B1
(45) Date of Patent: Aug. 11, 2015

(54) CAMERA MODULE WITH COMPACT X-Y FORM FACTOR

(71) Applicant: Google Inc., Mountain View, CA (US)

(72) Inventors: Lu Gao, San Jose, CA (US); Xi Chen, San Jose, CA (US); Xiaoyu Miao, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 73 days.

(21) Appl. No.: 14/053,271

(22) Filed: Oct. 14, 2013

(51) Int. Cl.
*H04N 5/225* (2006.01)

(52) U.S. Cl.
CPC ............ *H04N 5/2254* (2013.01); *H04N 5/2253* (2013.01)

(58) Field of Classification Search
CPC ............ H04N 5/23213; H04N 5/2356; H04N 5/2254; H04N 5/2253; G02B 813/001–813/009
USPC .......................... 348/345–357, 335, 373–376
See application file for complete search history.

(56) References Cited

U.S. PATENT DOCUMENTS

| | | | | |
|---|---|---|---|---|
| 5,122,861 A * | 6/1992 | Tamura et al. | ................. | 257/434 |
| 5,400,072 A * | 3/1995 | Izumi et al. | ................... | 348/335 |
| 5,673,083 A * | 9/1997 | Izumi et al. | ................... | 348/340 |
| 6,144,509 A * | 11/2000 | Baker | ........................... | 359/819 |
| 8,517,270 B2 | 8/2013 | Komi | | |
| 2004/0189862 A1 * | 9/2004 | Gustavsson et al. | ........... | 348/376 |
| 2006/0091488 A1 * | 5/2006 | Kang | ............................ | 257/433 |
| 2007/0031137 A1 * | 2/2007 | Bogdan et al. | ................ | 396/114 |
| 2007/0117423 A1 * | 5/2007 | Kim et al. | ........................ | 439/83 |
| 2008/0017941 A1 * | 1/2008 | Yang et al. | ..................... | 257/432 |
| 2008/0239516 A1 * | 10/2008 | Nakagawa | ..................... | 359/773 |
| 2009/0010638 A1 | 1/2009 | Chao et al. | | |
| 2010/0039553 A1 | 2/2010 | Kim et al. | | |
| 2011/0025909 A1 | 2/2011 | Tsai | | |
| 2012/0068292 A1 * | 3/2012 | Ikeda et al. | .................... | 257/432 |
| 2012/0162794 A1 * | 6/2012 | Lee et al. | ....................... | 359/824 |

* cited by examiner

*Primary Examiner* — Tuan Ho
*Assistant Examiner* — Marly Camargo
(74) *Attorney, Agent, or Firm* — Blakely Sokoloff Taylor & Zafman LLP

(57) ABSTRACT

A camera module includes a lens assembly, an image sensor, and a hybrid lens holder. The image sensor is aligned with the lens assembly to capture images of light incident through the lens assembly on a light sensitive surface of the image sensor. The hybrid lens holder holds the lens assembly a fixed offset from the image sensor. The hybrid lens holder includes a barrel section in which the lens assembly is held as a vertical stack rising above the image sensor and a flange section that rests on the image sensor to maintain the fixed offset from the image sensor. The discrete lens elements are held in place by direct contact with an inner side of the barrel section. The barrel section and the flange section are a single, contiguous housing structure.

17 Claims, 8 Drawing Sheets

CAMERA MODULE WITH COMPACT X-Y FORM FACTOR

TECHNICAL FIELD

This disclosure relates generally to the field of optics, and in particular but not exclusively, relates to camera modules.

BACKGROUND INFORMATION

FIG. 1 illustrates a conventional camera module 100 which includes an image sensor 105, a substrate 110, a lens holder 115, and a threaded lens barrel 120 that contains lens elements. Threaded lens barrel 120 includes outside threads that mate with inside threads disposed on an inside surface of lens holder 115. These threads allow threaded lens barrel 120 to be threaded in and out during the assembly process to tune or adjust the offset distance H1 between the lens elements within threaded lens barrel 120 and image sensor 105. Configuring offset distance H1 sets the focus depth and magnification of camera module 100. Since offset distance H1 is set during assembly and not adjustable during operation, camera module 100 is referred to as a fixed focus design.

While threaded lens barrel 120 provides simplified tuning during assembly along the Z-axis by rotating threaded lens barrel 120, it also adds significant bulk in the X-Y dimensions. In compact devices, such as laptops, netbooks, tablets, cell phones, and head mounted displays ("HMDs"), every millimeter of space can be significant.

FIG. 2 illustrates a wafer level camera module 200, which is fabricated using wafer replication technology. Lens elements 205 are replicated onto each of the wafers 210 and wafers 210 are then stacked on top of an image sensor wafer 215. The stacked wafers are then diced into individual camera modules. Wafer level camera module, such as camera module 200, can save significant X-Y space; however, the materials suitable for wafer level camera modules are very limited and the optical performance of lens elements 205 is generally poor. Thus the overall performance of such camera modules is poor when compared to conventional camera modules with barrel shaped lens assemblies.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system and apparatus for a compact camera module including a hybrid lens holder are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 3A:
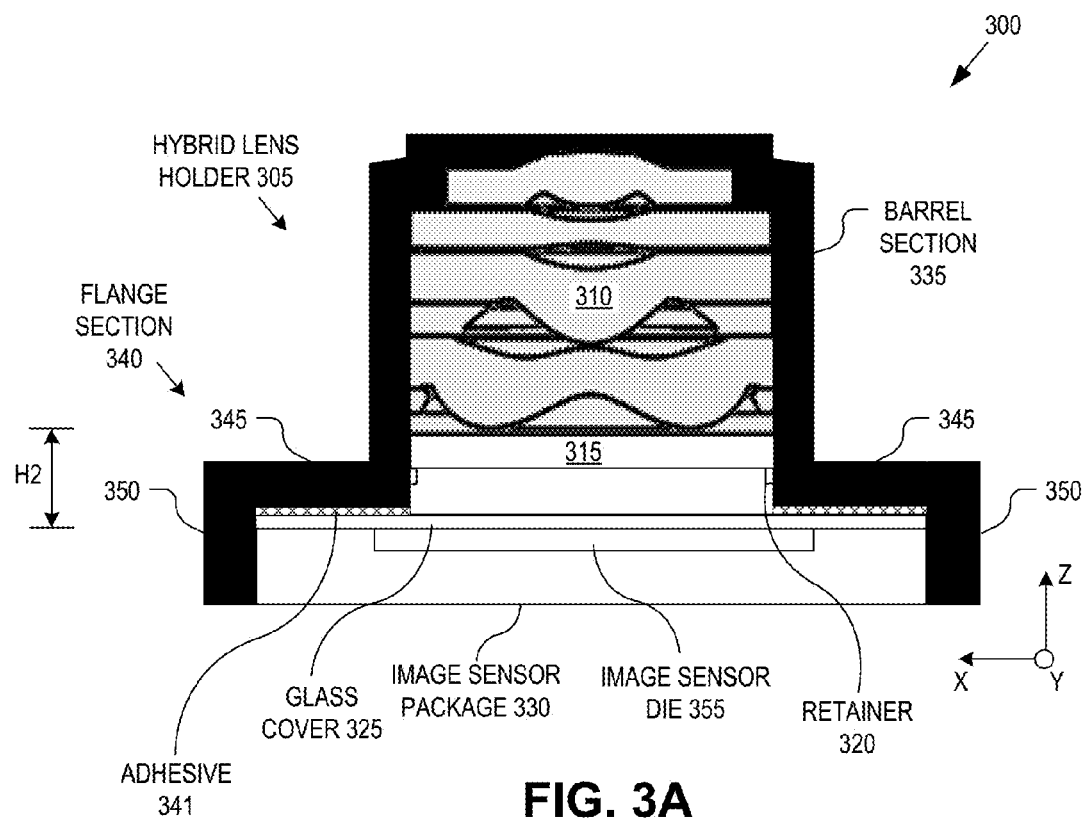
FIG. 3A is a cross-sectional view illustrating a camera module including a hybrid lens holder and image sensor package, in accordance with an embodiment of the disclosure.
Figure 3B:
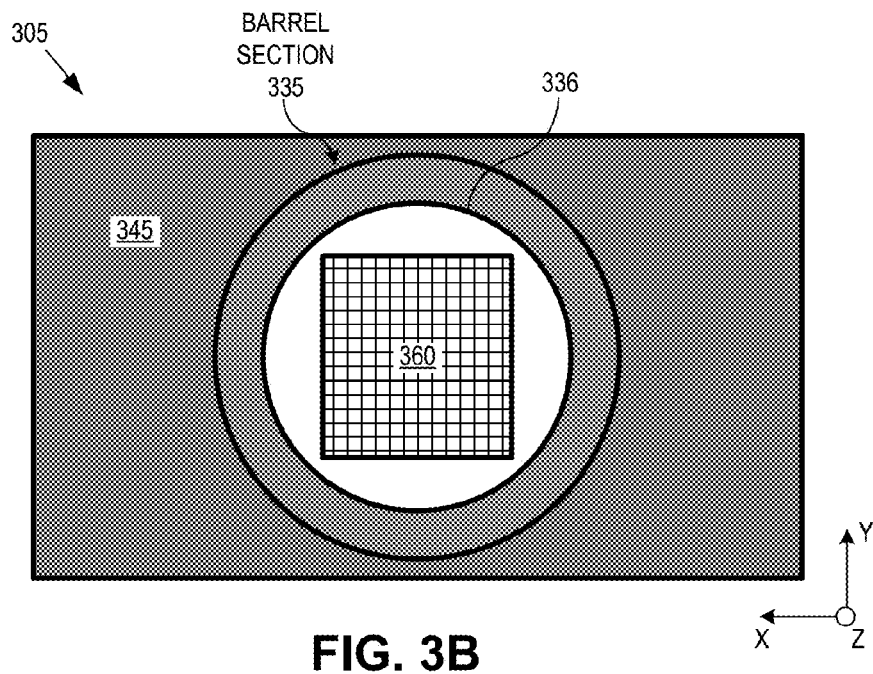
FIG. 3B is a top view illustrating a camera module including a hybrid lens holder and image sensor package, in accordance with an embodiment of the disclosure.

FIGS. 3A and 3B illustrate a camera module 300 including a hybrid lens holder and image sensor package, in accordance with an embodiment of the disclosure. FIG. 3A is a cross-sectional view of camera module 300 while FIG. 3B is a plan view of the same. The illustrated embodiment of camera module 300 includes a hybrid lens holder 305, a lens assembly 310 including a plurality of discrete lens elements, an infrared ("IR") cut filter 315, a retainer 320, a glass cover 325, and an image sensor package 330. The illustrated embodiment of hybrid lens holder 305 includes a barrel section 335 and a flange section 340. The illustrated embodiment of flange section 340 includes a horizontal flange portion 345 and a vertical flange portion 350. The illustrated embodiment of image sensor package 330 includes image sensor die 355 having a pixel array 360 disposed on a light sensitive side of the image sensor die 355.

During operation light enters through an aperture on the top of hybrid lens holder 305, passes through lens assembly 310, and focused onto a light sensitive surface including pixel array 360 of the image sensor. Lens assembly 310 includes a plurality of discrete lens elements that bring the incident light into focus on pixel array 360. The image sensor may be implemented as a complementary metal-oxide-semiconductor ("CMOS") image sensor, a charged coupled device ("CCD") image sensor, or otherwise. FIG. 3A illustrates the image sensor as an image sensor die 355 disposed within image sensor package 330 and overlaid by glass cover 325.

Hybrid lens holder 305 includes barrel section 335 and flange section 340 having a horizontal flange portion 345 and a vertical flange portion 350. Barrel section 335 holds the discrete lens elements of lens assembly 310 and IR cut filter 315 as a vertical stack rising above the image sensor. Lens assembly 310 may include ring spacers to maintain proper offsets between each of the discrete elements of the vertical stack. The individual discrete lens elements are held in place and vertically aligned within barrel section 335 by direct contact with an inner side 336 of barrel section 335. In one embodiment, the diameter of each discrete lens element is fabricated to precisely fit within barrel section 335. In one embodiment, mechanical retainer 320 holds the lens assembly 310 from falling down within barrel section 335. Retainer 320 may be implemented as a retainer ring that fits within a groove within inner side 336. In other embodiments, various grooves, flanges, clips, or protrusions may be disposed on the inner side 336 to hold lens assembly 310 from falling out of barrel section 335.

Flange section 340 of hybrid lens holder 305 rests on the image sensor itself and maintains a fixed offset between the image sensor and lens assembly 310. Accordingly, camera module 300 is a focus free camera module in that there is no built in gross adjustment mechanism to alter the focus or offset H2 between lens assembly 310 and the image sensor (e.g., light sensitive surface of image sensor die 355) during assembly. In contrast to FIG. 1, hybrid lens holder 305 does not include threads on inner side 336 to mate with threads of a thread lens barrel, such as threaded lens barrel 120. In fact, camera module 300 does not include a threaded lens barrel interposed between lens assembly 310 and barrel section 335. Rather, the focus of camera module 300 is fixed by design, since the offset dimension H2 is fixed. However, in some embodiments, a fine tune adjustment may be implemented by controlling the amount of adhesive 341 applied between horizontal flange portion 345 and glass cover 325 of the image sensor. For example, a UV curing adhesive can be applied with varying thicknesses to implement a fine tuning during assembly.

Figure 1:
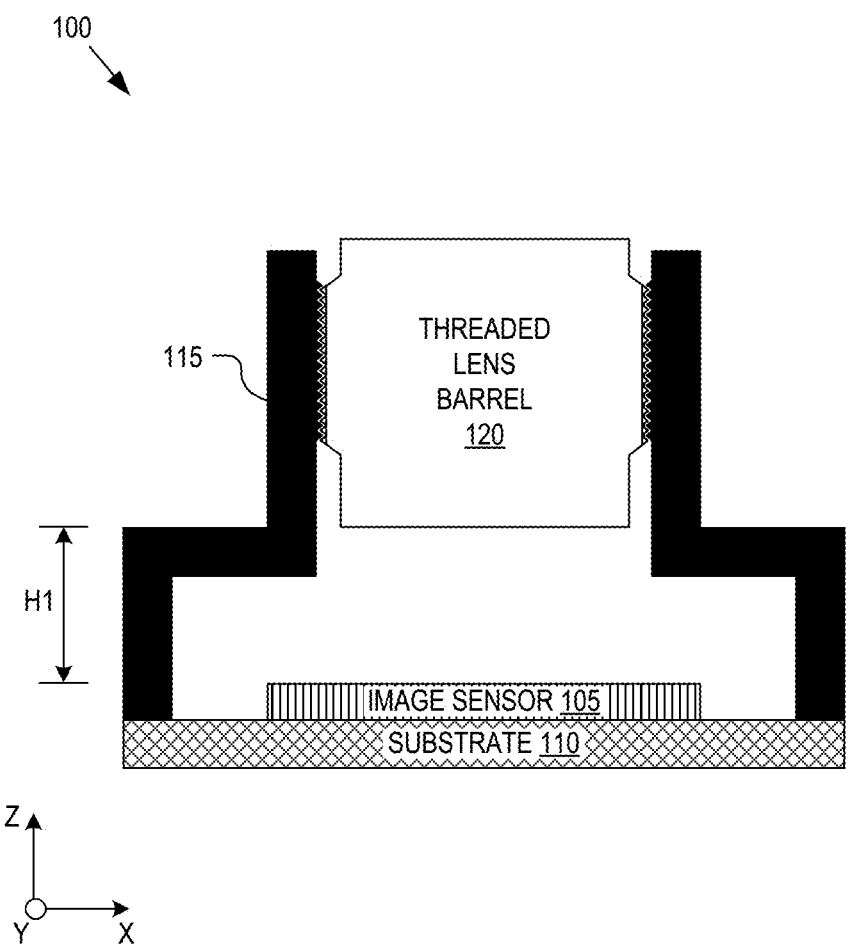
FIG. 1 (PRIOR ART) illustrates a conventional camera module.
Figure 2:
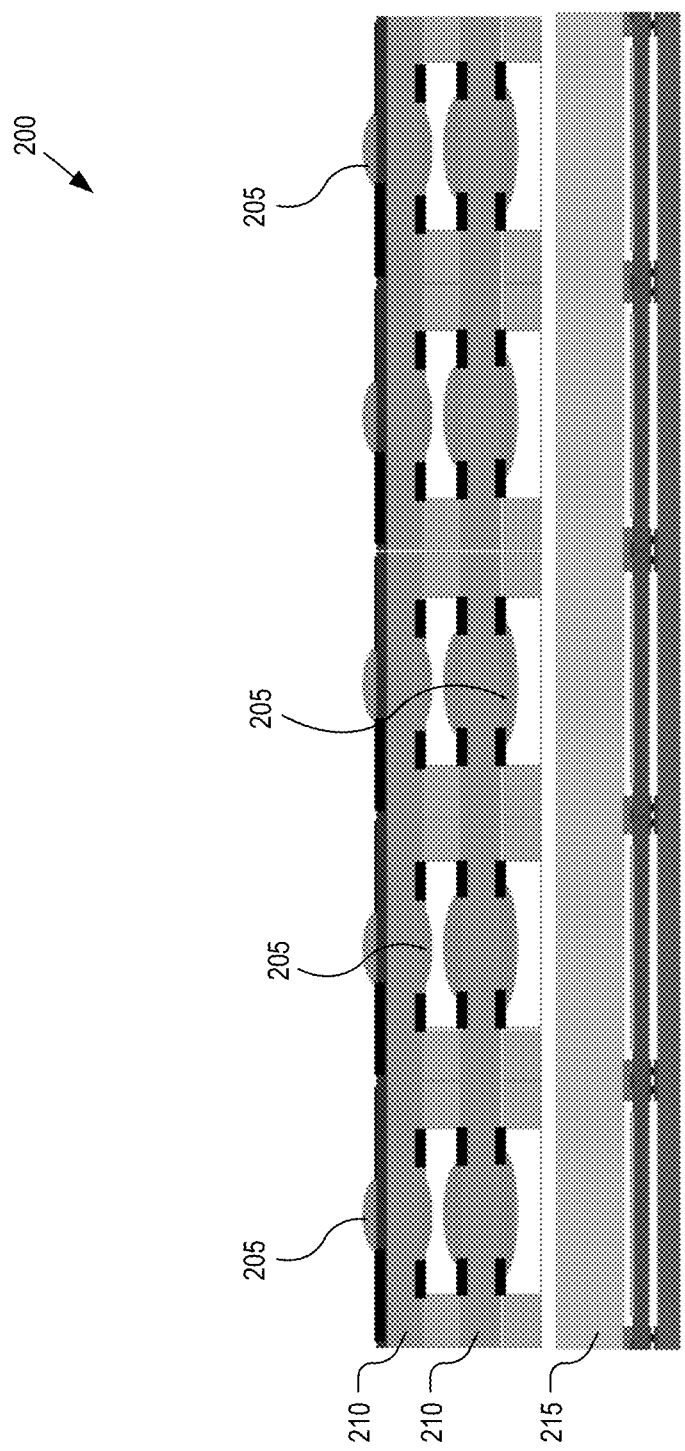
FIG. 2 (PRIOR ART) illustrates a wafer level camera module.

By mounting horizontal flange portion 345 of hybrid lens holder 305 directly to a top surface of the image sensor itself, as compared to FIG. 1 where lens holder 115 is mounted to substrate 115 upon which image sensor 105 is mounted, eliminates variability in the planar trueness of substrate 110 from affecting the focus of camera module 300. The bond between substrate 110 and image sensor 105 can also introduce variability to the offset distance H1 in FIG. 1. This variability in assembly and manufacturing is eliminated as factors that affect the offset dimension H2 in FIG. 3A. By reducing the variability in the focal distance (offset dimension H2), camera module 300 is well suited to be implemented as a focus free camera module with the option of fine tuning during assembly by careful application of adhesive 341.

Thus, horizontal flange section 340 rests directly on the image sensor itself and statically maintains the fixed offset H2. In some embodiments, horizontal flange section 340 surrounds pixel array 360 and forms a seal to the image sensor to prevent contaminants (e.g., dust, moisture, etc.) from inserting themselves into the optical path between lens assembly 310 and the image sensor. In one embodiment, adhesive 341 forms a hermetic seal between horizontal flange portion 345 and the top surface of the image sensor (e.g., glass cover 325).

In the illustrated embodiment, flange section 340 further includes a vertical flange portion 350 that wraps around the edges of the image sensor and passively aligns the image sensor to lens assembly 310. In one embodiment, the passive alignment is achieved by a mechanical pressure fit between vertical flange portion 350 and the edges of the image sensor. By fabricating hybrid lens holder 305 as a single, contiguous housing structure (e.g., a single molded metal or plastic element), the design tolerances over image sensor alignment and fixed offset dimension H2 can be carefully controlled.

Without the need of threaded lens barrel 120 to provide variable focus during assembly, the X-Y dimension of camera module 300 can be significantly reduced relative to conventional camera module 100. For example, the outside diameter dimension of barrel section 335 of camera module 300 may be reduced to 2.4 mm for an image sensor having a pixel array 360 with a diameter of 1.765 mm. In contrast, the outside dimension of the barrel section of conventional camera module 100 for the same sized pixel array 360 may require 3.3 mm. Similarly, the width of substrate 110 may be about 4.075 mm, while the outside dimension width of vertical flange section 350 may be 3.575 mm. In an example embodiment, a 2.4 mm outside diameter dimension for barrel section 335 can hold a lens diameter of 1.3 mm for lens assembly 310. As stated above, a 1.3 mm lens diameter would typically require a 3.3 mm outside diameter for the barrel section of conventional camera module 100. When incorporating a camera module into compact devices, such as head mounted displays, cell phones, tablets, netbooks, laptops, watches, etc., space savings of even 1 mm in a given dimension can be significant.

Figure 4A:
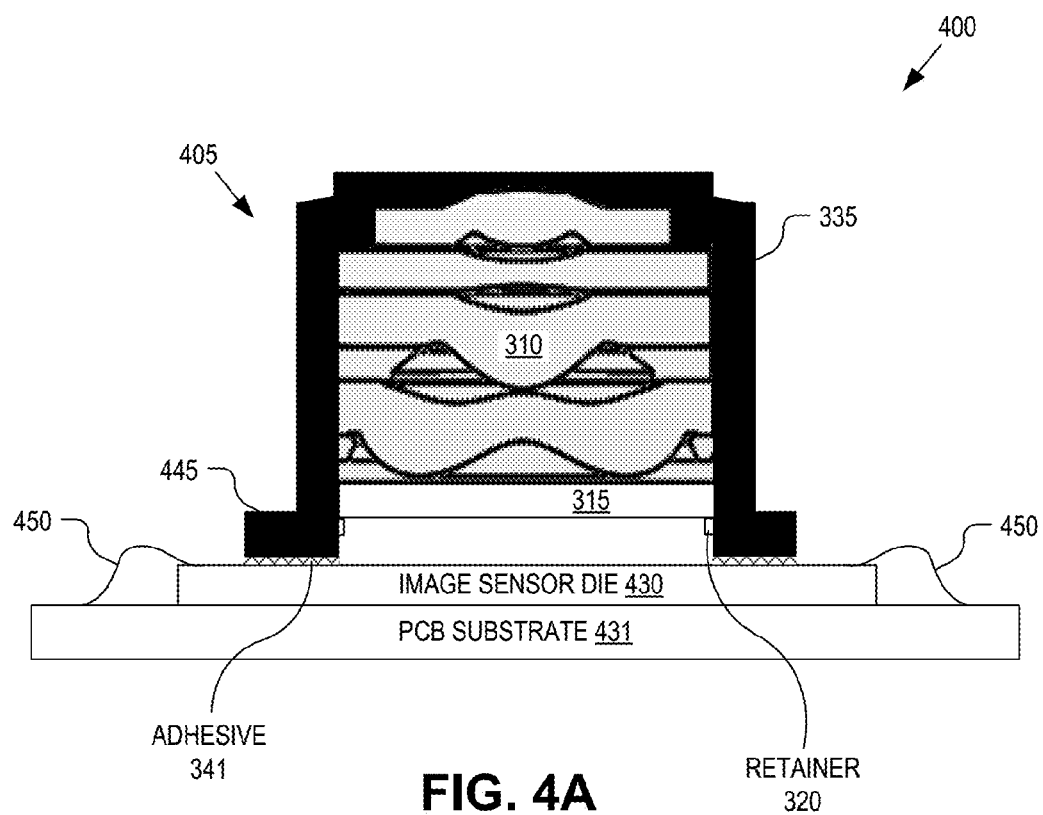
FIG. 4A is a cross-sectional view illustrating a camera module including a hybrid lens holder and a directly mounted image sensor die, in accordance with an embodiment of the disclosure.
Figure 4B:
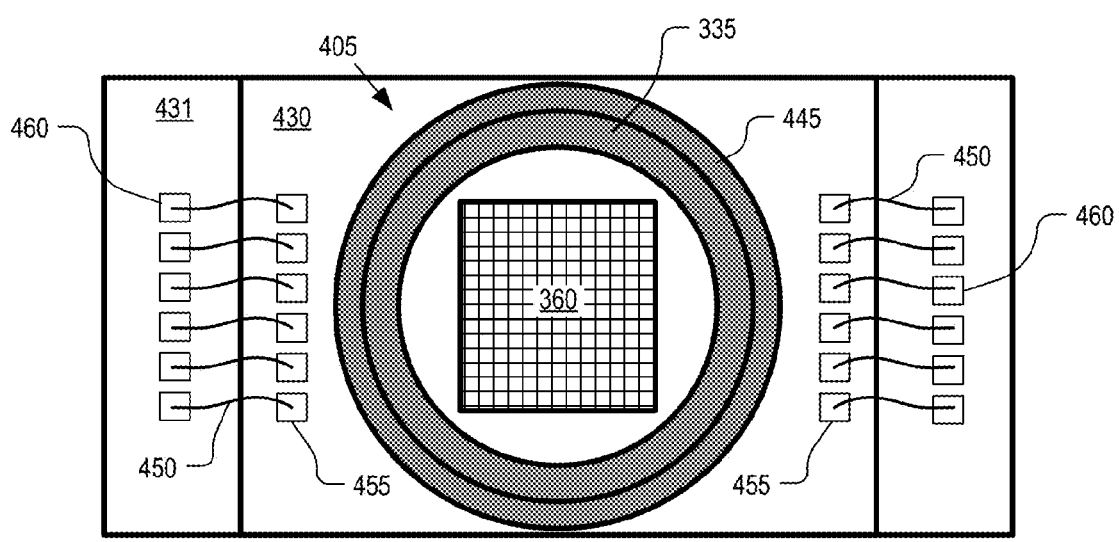
FIG. 4B is a top view illustrating a camera module including a hybrid lens holder and a directly mounted image sensor die, in accordance with an embodiment of the disclosure.

FIGS. 4A and 4B illustrate a camera module 400 including a hybrid lens holder and a directly mounted image sensor die, in accordance with an embodiment of the disclosure. FIG. 4A is a cross-sectional view of camera module 400 while FIG. 4B is a plan view of the same. The illustrated embodiment of camera module 400 includes a hybrid lens holder 405, lens assembly 310, IR cut filter 315, retainer 320, an image sensor die 430, a printed circuit board ("PCB") substrate 431, wire leads 450, and pads 455 and 460. The illustrated embodiment of hybrid lens holder 405 includes a barrel section 335 and a flange section that includes a horizontal flange portion 445. The illustrated embodiment of image sensor die 430 includes a pixel array 360 disposed on a light sensitive side of the image sensor die 430.

Camera module 400 is similar to camera module 300 except that the flange section does not include a vertical flange portion that wraps around the edges of the image sensor and horizontal flange portion 445 rests directly on the image sensor die 430 with wire leads 450 and pads 455 and 460 external to hybrid lens holder 405. Barrel section 335 and horizontal flange portion 445 are fabricated as a single, contiguous housing structure. In the illustrated embodiment, horizontal flange portion 445 is mounted directly onto the light sensitive side of image sensor die 430. Wire leads 450 transmit power and data signals between pixel array 360 and PCB substrate 431. Since wire leads 450 and pads 455 and 460 are external to hybrid lens holder 405, adhesive 341 may be used to bond hybrid lens holder 405 directly to the silicon bulk of image sensor die 430 and seal off pixel array 360 from contaminants. Thus, the embodiment of FIGS. 4A and 4B need not encase image sensor die 430 within a package, thereby further reducing the overall form factor of camera module 400.

Figure 5A:
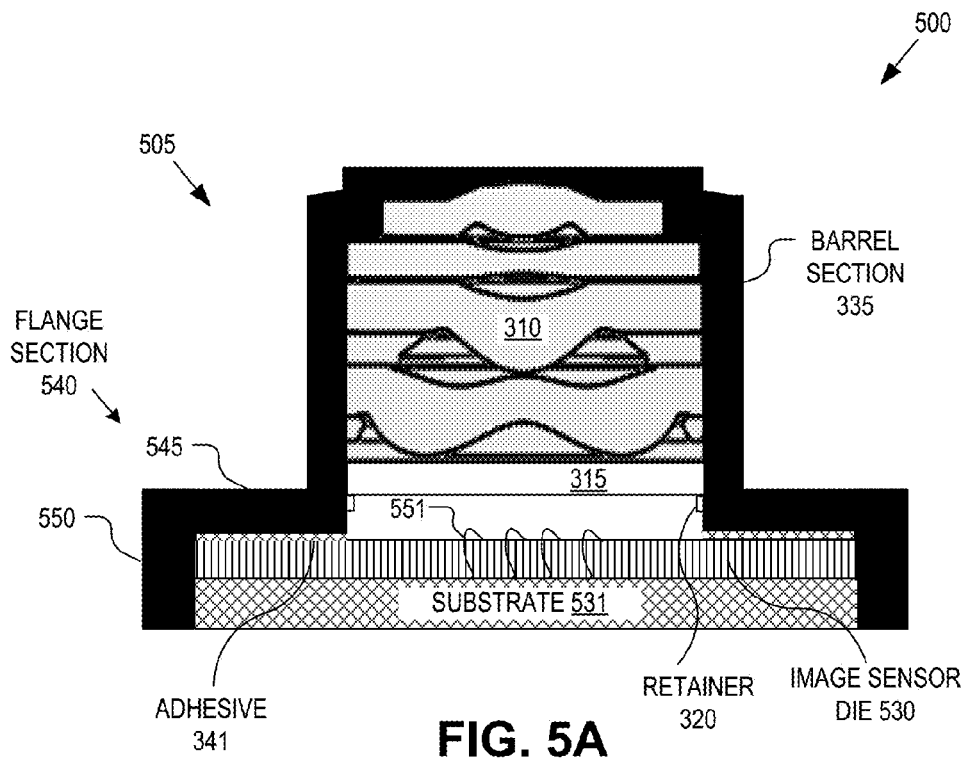
FIG. 5A is a cross-sectional view illustrating a camera module including a hybrid lens holder having a raised cavity for wire leads, in accordance with an embodiment of the disclosure.
Figure 5B:
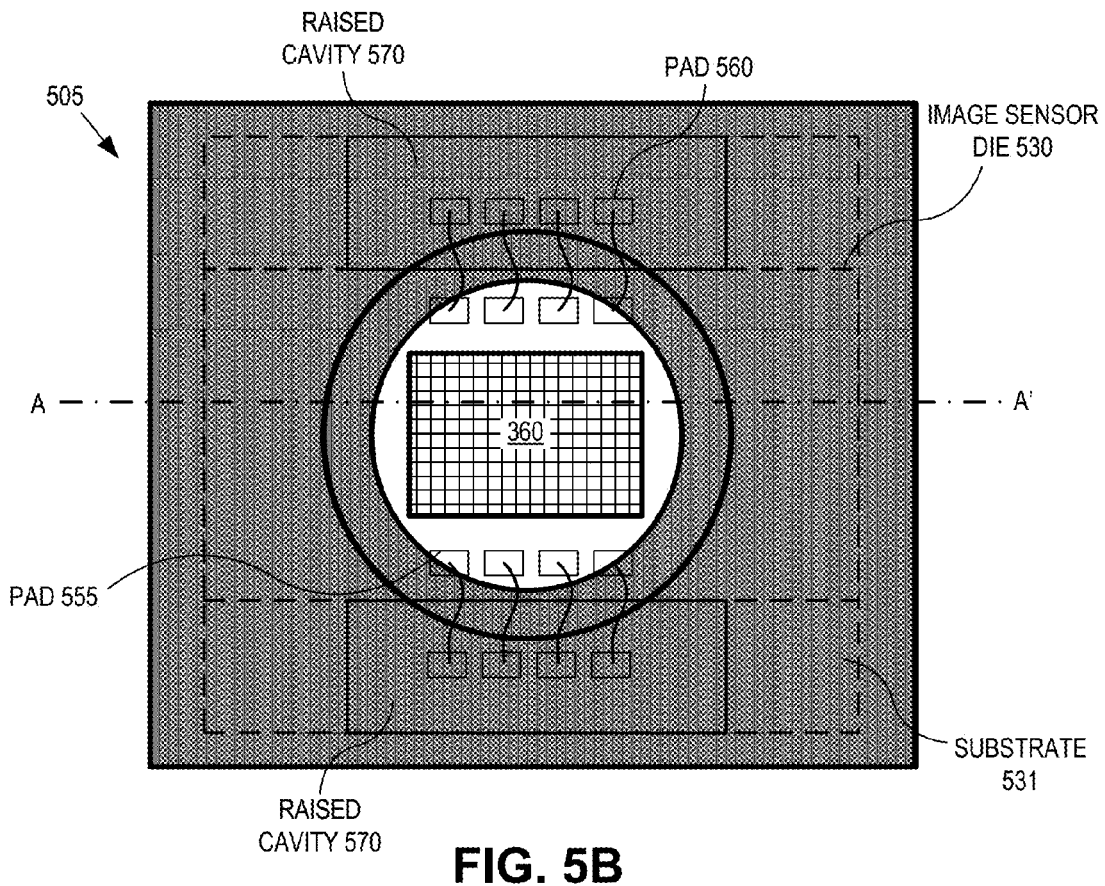
FIG. 5B is a top view illustrating a camera module including a hybrid lens holder having a raised cavity for wire leads, in accordance with an embodiment of the disclosure.

FIGS. 5A and 5B illustrate a camera module 500 including a hybrid lens holder having a raised cavity for wire leads, in accordance with an embodiment of the disclosure. FIG. 5B is a plan view of camera module 500 while FIG. 5A is a cross-sectional view of the same along line A-A' in FIG. 5B. The illustrated embodiment of camera module 500 includes a hybrid lens holder 505, lens assembly 310, IR cut filter 315, retainer 320, an image sensor die 530, a PCB substrate 531, wire leads 551, and pads 555 and 560. The illustrated embodiment of hybrid lens holder 505 includes a barrel section 335 and a flange section 540 that includes a horizontal flange portion 545 and a vertical flange portion 550. The illustrated embodiment of horizontal flange portion 545 includes raised cavities 570. The illustrated embodiment of image sensor die 530 includes a pixel array 360 disposed on a light sensitive side of the image sensor die 530.

Camera module 500 is similar to camera module 400 except that the flange section 540 does include a vertical flange portion 550 that wraps around the edges image sensor die 530 and substrate 531. Furthermore, wire leads 551 and pads 555 and 560 are hidden under hybrid lens holder 505 within raised cavities 570. Barrel section 335 and flange section 540 are fabricated as a single, contiguous housing structure. In the illustrated embodiment, horizontal flange portion 545 is mounted directly onto the light sensitive side of image sensor die 530. Wire leads 551 transmit power and data signals between pixel array 360 and PCB substrate 531. Since wire leads 551 and pads 555 and 560 are disposed under raised cavities 570 of horizontal flange portion 545, hybrid lens holder 505 seals wire leads 551 and pads 555 and 560 off from the external environment with pixel array 360. Vertical flange portion 550 also operates to passively align and protect the edges of image sensor die 530. Thus, hybrid lens holder 505 operates to protect image sensor die 530 in lieu of chip packaging.

Figure 6A:
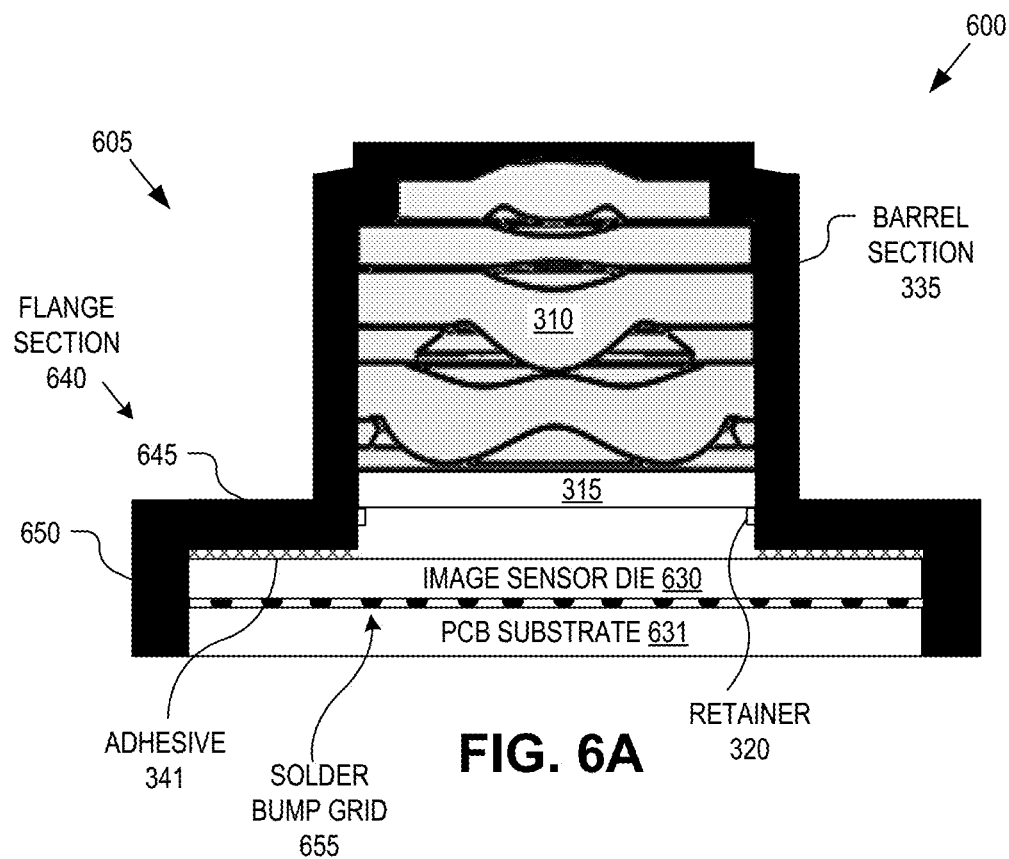
FIG. 6A is a cross-sectional view illustrating a camera module including a hybrid lens holder and an image sensor with a backside solder bump grid, in accordance with an embodiment of the disclosure.
Figure 6B:
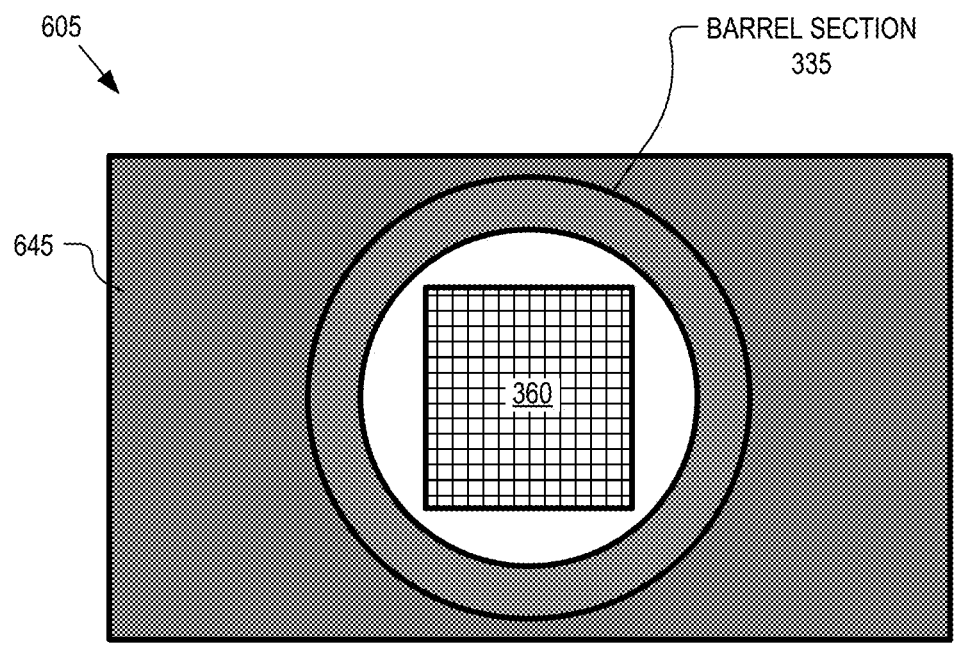
FIG. 6B is a top view illustrating a camera module including a hybrid lens holder having and an image sensor with a backside solder bump grid, in accordance with an embodiment of the disclosure.

FIGS. 6A and 6B illustrate a camera module 600 including a hybrid lens holder and an image sensor with a backside solder bump grid, in accordance with an embodiment of the disclosure. FIG. 6A is a cross-sectional view of camera module 600 while FIG. 6B is a plan view of the same. The illustrated embodiment of camera module 600 includes a hybrid lens holder 605, lens assembly 310, IR cut filter 315, retainer 320, an image sensor die 630, a PCB substrate 631, and a solder bump grid 655. The illustrated embodiment of hybrid lens holder 605 includes a barrel section 335 and a flange section 640 that includes a horizontal flange portion 645 and a vertical flange portion 650. The illustrated embodiment of image sensor die 630 includes a pixel array 360 disposed on a light sensitive side of the image sensor die 630.

Camera module 600 is similar to camera module 500 except that power and data signals are communicated through solder bump grid 655 on the backside of image sensor die 630 as opposed to using wire leads and pads. As such, horizontal flange portion 645 need not include raised cavities. Barrel section 335 and flange section 640 are fabricated as a single, contiguous housing structure. In the illustrated embodiment, horizontal flange portion 645 is mounted directly onto the light sensitive side of image sensor die 630. Vertical flange portion 650 operates to passively align and protect the edges of image sensor die 630. Thus, hybrid lens holder 605 operates to protect image sensor die 630 in lieu of chip packaging.

Figure 7:
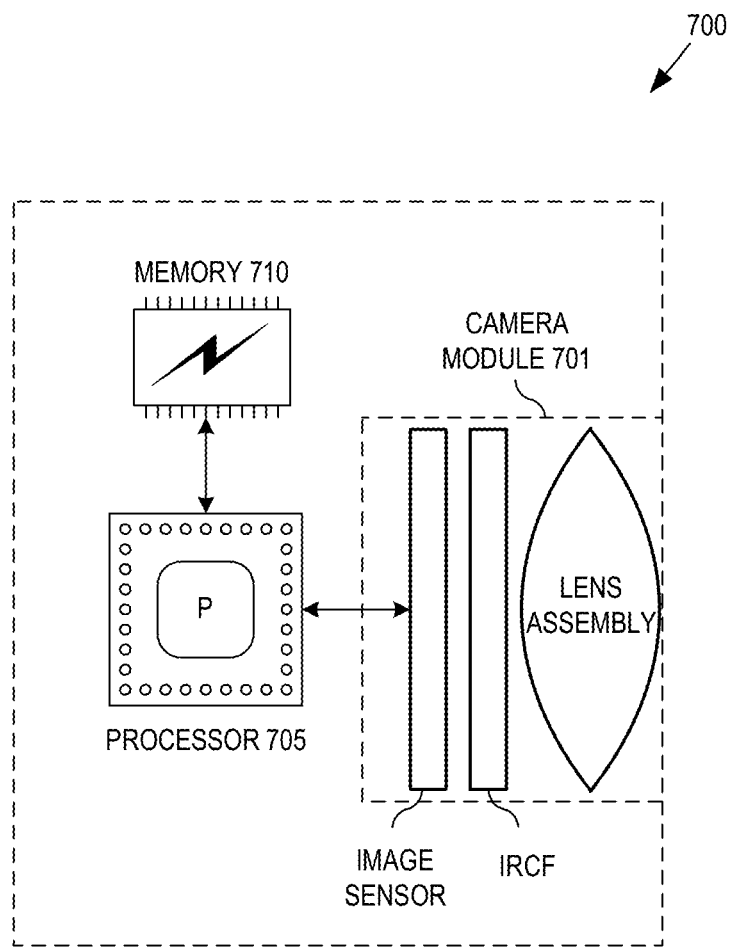
FIG. 7 is a functional block diagram of a camera system including a camera module, in accordance with an embodiment of the disclosure.

FIG. 7 is a functional block diagram illustrating a camera system 700, in accordance with an embodiment of the disclosure. The illustrated embodiment of camera system 700 includes camera module 701, a processor 705, and memory 710. Camera module 701 may be implemented with any of camera modules 300, 400, 500, 600, or a combination thereof, described above. Camera system 700 is well suited for integration within an head wearable display, but may also be used in various other compact products including cell phones, tablets, laptops, netbooks, watches, etc. Camera module 701 provides high quality optics having a compact form factor in the X-Y dimension. During operation, processor 705 may perform a number of post imaging functions including cropping, compression, image analysis, etc. using instructions stored in memory 710. The acquired images may further be stored into memory 710, which may be implemented using volatile memory (DRAM, SRAM, etc.) or non-volatile memory (e.g., flash memory, etc.).

Figure 8:
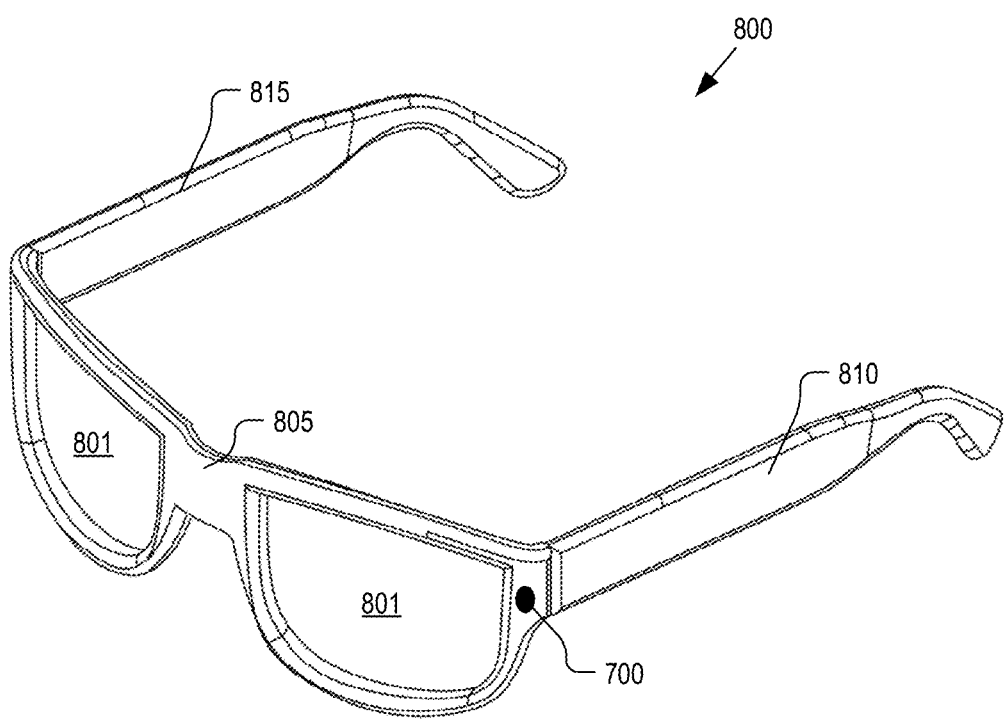
FIG. 8 is a perspective view illustrating a demonstrative system using a compact camera module having a hybrid lens holder, in accordance with an embodiment of the disclosure.

FIG. 8 is a perspective view illustrating a binocular head wearable display 800 that may include a camera system 700, in accordance with an embodiment of the disclosure. The illustrated embodiment of binocular head wearable display 800 includes two see-through displays 801 that may present each eye of the user with a computer generated image ("CGI") superimposed over there vision of the external world. Camera system 700 may be used to capture images of the external world, which are then processed by processor 705 to generate CGI that is context sensitive to the user's environment.

The see-through displays 801 are mounted to a frame assembly, which includes a nose bridge 805, left ear arm 810, and right ear arm 815. Camera system 700 may be disposed in any of portion of the frame assembly with a forward facing perspective. In other embodiments, camera module 700 may be a rear facing camera positioned to capture eye images, in addition to, or in place of, a forward facing camera. Although FIG. 8 illustrates a binocular embodiment, display 800 may also be implemented as a monocular display.

The see-through displays 801 are secured into an eye glass arrangement or head wearable display that can be worn on the head of a user. The left and right ear arms 810 and 815 rest over the user's ears while nose bridge 805 rests over the user's nose. The frame assembly is shaped and sized to position each display in front of a corresponding eye of the user. Other frame assemblies having other shapes may be used (e.g., a visor with ear arms and a nose bridge support, a single contiguous headset member, a headband, goggles type eyewear, etc.).

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A camera module, comprising:
    a lens assembly including a plurality of discrete lens elements;
    an image sensor aligned with the lens assembly to capture images of light incident through the lens assembly on a light sensitive surface of the image sensor;
    an hybrid lens holder which holds the lens assembly a fixed offset from the image sensor, the hybrid lens holder including:
        a barrel section in which the lens assembly is held as a vertical stack rising above the image sensor, wherein the discrete lens elements are held in place by direct contact with an inner side of the barrel section; and
        a flange section that rests on the image sensor to maintain the fixed offset from the image sensor, wherein the barrel section and the flange section are a single, contiguous housing structure, wherein the flange section includes a horizontal flange portion that rests on the image sensor, wherein the fixed offset is statically maintained by the horizontal flange,
    wherein the image sensor comprises an image sensor die and wherein the horizontal flange portion rests directly on a top surface of the image sensor die that includes the light sensitive surface and surrounds a pixel array of the image sensor die,
    wherein the horizontal flange portion is bonded directly to the image sensor die to seal off the pixel array.

2. The camera module of claim 1, wherein the lens assembly is held in place within the barrel section of the hybrid lens holder without a threaded lens barrel interposed between the lens assembly and the barrel section of the hybrid lens holder.

3. The camera module of claim 1, wherein the flange section further includes:
    a vertical flange portion for wrapping around edges of the image sensor and passively aligning the image sensor with the lens assembly.

4. The camera module of claim 1, further comprising:
    a printed circuit board ("PCB") substrate upon which the image sensor die is disposed, wherein wire leads connect first pads on the image sensor die disposed external to the horizontal flange portion to second pads on the PCB substrate.

5. The camera module of claim 1, further comprising:
    a printed circuit board ("PCB") substrate upon which the image sensor die is disposed, wherein wire leads connect first pads on the image sensor die disposed underneath the horizontal flange portion to second pads on the PCB substrate also underneath the horizontal flange portion, wherein the wire leads, the first pads, and the second pads are disposed under a raised cavity portion of the horizontal flange portion.

6. The camera module of claim 1, wherein the image sensor die includes a backside solder bump grid for communicating power and signals between the image sensor die and a substrate.

7. The camera module of claim 1, wherein the image sensor comprises an image sensor package and wherein the horizontal flange portion rests on the image sensor package and surrounds a pixel array of the image sensor.

8. The camera module of claim 1, wherein the horizontal flange portion is adhered to the image sensor via a UV curing glue.

9. The camera module of claim 1, further comprising:
    an infrared ("IR") cut filter disposed within the barrel section of the hybrid lens holder between the lens assembly and the image sensor, wherein the IR cut filter is held in place by direct contact with the inner side of the barrel section.

10. The camera module of claim 1, wherein the lens assembly is held in place within the barrel section by direct contact with the inner side of the barrel section and a mechanical retainer.

11. An apparatus for a camera, comprising:
    an image sensor including an image sensor die; and
    a hybrid lens holder, including:
        a barrel section shaped to hold a lens assembly as a vertical stack rising above an image sensor, wherein discrete lens elements of the lens assembly are held in place by direct contact with an inner side of the barrel section, wherein the inner side of the barrel section does not include a thread for mating to a threaded lens barrel; and
        a flange section shaped to rest on the image sensor to maintain a fixed offset between the image sensor and the lens assembly, wherein the barrel section and the flange section are a single, contiguous housing structure, wherein the flange section includes a horizontal flange portion that rests on the image sensor, wherein the fixed offset is statically maintained by the horizontal flange,
    wherein the horizontal flange portion is directly bonded to a top surface of the image sensor die and surrounds a pixel array of the image sensor die to seal off the pixel array.

12. The apparatus of claim 11, wherein the flange section further includes:
    a vertical flange portion for wrapping around edges of the image sensor and passively aligning the image sensor with the lens assembly.

13. The apparatus of claim 12, further comprising:
    a printed circuit board ("PCB") substrate upon which the image sensor die is disposed, wherein wire leads connect first pads on the image sensor die disposed external to the horizontal flange portion to second pads on the PCB substrate.

14. The apparatus of claim 12, further comprising:
    a printed circuit board ("PCB") substrate upon which the image sensor die is disposed, wherein wire leads connect first pads on the image sensor die disposed underneath the horizontal flange portion to second pads on the PCB substrate also underneath the horizontal flange portion, wherein the wire leads, the first pads, and the second pads are disposed under a raised cavity portion of the horizontal flange portion.

15. The apparatus of claim 12, wherein the image sensor comprises an image sensor package and wherein the horizontal flange portion rests on the image sensor package and surrounds a pixel array of the image sensor.

16. The apparatus of claim 11, further comprising:
    the lens assembly; and
    an infrared ("IR") cut filter disposed within the barrel section of the hybrid lens holder between the lens assembly and the image sensor, wherein the IR cut filter is held in place by direct contact with the inner side of the barrel section.

17. The apparatus of claim 16, further comprising:
    a mechanical retainer ring disposed between the IR cut filter and the image sensor to hold the lens assembly and the IR cut filter within the barrel section of the hybrid lens holder.

* * * * *